United States Patent
Koshikawa et al.

(10) Patent No.: US 7,332,538 B2
(45) Date of Patent: Feb. 19, 2008

(54) HEAT-CURABLE FLUOROPOLYETHER RUBBER COMPOSITIONS AND RUBBER ARTICLES

(75) Inventors: Hidenori Koshikawa, Gunma-ken (JP); Noriyuki Koike, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 505 days.

(21) Appl. No.: 10/791,861

(22) Filed: Mar. 4, 2004

(65) Prior Publication Data

US 2004/0176521 A1 Sep. 9, 2004

(30) Foreign Application Priority Data

Mar. 6, 2003 (JP) .............................. 2003-060001

(51) Int. Cl.
  *C08L 27/12* (2006.01)
(52) U.S. Cl. .................. 524/492; 524/588; 524/520
(58) Field of Classification Search ................ 524/492, 524/493, 495, 496
  See application file for complete search history.

(56) References Cited

U.S. PATENT DOCUMENTS

| 4,080,319 | A | * | 3/1978 | Caporiccio et al. | ......... 528/183 |
|---|---|---|---|---|---|
| 4,946,936 | A | * | 8/1990 | Moggi et al. | ................ 528/392 |
| 5,208,293 | A | * | 5/1993 | Oki et al. | ................... 525/199 |
| 5,226,650 | A | * | 7/1993 | Suttner | ........................ 473/463 |
| 5,384,374 | A | * | 1/1995 | Guerra et al. | ............. 525/326.4 |
| 5,717,036 | A | * | 2/1998 | Saito et al. | .............. 525/326.3 |
| 6,005,054 | A | * | 12/1999 | Barbieri et al. | .......... 525/326.3 |
| 6,140,437 | A | * | 10/2000 | Kitaichi et al. | ............. 526/247 |
| 6,503,986 | B1 | * | 1/2003 | Tanaka et al. | ............. 525/199 |
| 6,576,701 | B2 | * | 6/2003 | Osawa et al. | ............... 524/520 |
| 6,638,717 | B2 | * | 10/2003 | Perrin et al. | ................... 435/6 |
| 6,703,461 | B1 | * | 3/2004 | Tanaka et al. | ............. 526/242 |
| 6,825,267 | B2 | * | 11/2004 | Osawa | ........................ 524/588 |
| 6,897,330 | B2 | * | 5/2005 | Matsuda et al. | ............. 556/419 |
| 6,916,875 | B2 | * | 7/2005 | Osawa et al. | ............... 524/588 |
| 7,087,673 | B2 | * | 8/2006 | Matsuda et al. | ............. 524/544 |
| 2005/0070637 | A1 | * | 3/2005 | Nishibayashi et al. | ........ 524/80 |
| 2006/0052546 | A1 | * | 3/2006 | Morikawa et al. | ....... 525/326.2 |

FOREIGN PATENT DOCUMENTS

| JP | 8-199070 A | 8/1996 |
|---|---|---|
| JP | 2990646 B2 | 10/1999 |

* cited by examiner

*Primary Examiner*—Katarzyna Wyrozebski
(74) *Attorney, Agent, or Firm*—Birch, Stewart, Kolasch & Birch, LLP

(57) ABSTRACT

A heat-curable fluoropolyether rubber composition comprising (A) 100 pbw of a straight-chain perfluoropolyether compound having at least two alkenyl groups in a molecule, (B) 1-100 pbw of a reinforcing filler, and (C) 0.1-5 pbw of an organic peroxide is freed from cure inhibition by catalyst poisons, and its cured rubber has improved properties including heat resistance, chemical resistance, solvent resistance, parting property, water repellency, oil repellency and low-temperature properties.

10 Claims, No Drawings

HEAT-CURABLE FLUOROPOLYETHER RUBBER COMPOSITIONS AND RUBBER ARTICLES

This Non-provisional application claims priority under 35 U.S.C. § 119(a) on Patent Application No(s). 2003-060001 filed in Japan on Mar. 6, 2003, the entire contents of which are hereby incorporated by reference.

BACKGROUND OF THE INVENTION

1. Field of the Invention

This invention relates to heat-curable fluoropolyether rubber compositions which cure into products having good heat resistance, chemical resistance, solvent resistance, parting property, water repellency, oil repellency and low-temperature properties.

2. Background Art

Japanese Patent No. 2,990,646 (JP-A 8-199070) discloses a composition comprising (A) a straight-chain fluoropolyether compound having at least two alkenyl groups in a molecule and a perfluoropolyether structure in the backbone, (B) an organosilicon compound having at least two H—SiOSi structures in a molecule, and (C) a hydrosilylation catalyst, which cures into parts having a good profile of heat resistance, chemical resistance, solvent resistance, parting property, water repellency, oil repellency and low-temperature properties.

However, when the crosslinking method applied to the fluoropolyether composition is a catalytic reaction like hydrosilylating reaction, there is a possibility of catalyst poisoning to inhibit curing. Catalyst poisons in the hydrosilylating reaction include sulfur compounds and amines, which are frequently employed as additives to customary synthetic rubbers. If the fluoropolyether composition is worked on the same rolls or molds as used in the processing of such other synthetic rubbers, there is a possibility that the composition fail to cure on account of the catalyst poisons left on the rolls or molds.

SUMMARY OF THE INVENTION

Therefore, an object of the invention is to provide fluoropolyether rubber compositions which avoid cure inhibition by catalyst poisons and are improved in heat resistance, chemical resistance, solvent resistance, parting property, water repellency, oil repellency and low-temperature properties. Another object is to provide rubber articles made therefrom.

It has been found that when the crosslinking method for a fluoropolyether rubber composition is switched from hydrosilylating catalytic reaction to radical reaction using organic peroxides, the fluoropolyether rubber composition is freed from cure inhibition by catalyst poisons and its cured rubber parts have improved properties including heat resistance, chemical resistance, solvent resistance, parting property, water repellency, oil repellency and low-temperature properties.

The present invention provides a heat-curable fluoropolyether rubber composition comprising (A) 100 parts by weight of a straight-chain perfluoropolyether compound having at least two alkenyl groups in a molecule, (B) 1 to 100 parts by weight of a reinforcing filler, and (C) 0.1 to 5 parts by weight of an organic peroxide.

The crosslinking method to be applied to the composition is switched from the hydrosilylating catalytic reaction which has been employed for such fluoropolyether rubber compositions to radical reaction using organic peroxides. Then the fluoropolyether rubber composition is freed from cure inhibition by catalyst poisons and cures into rubber parts having improved properties including heat resistance, chemical resistance, solvent resistance, parting property, water repellency, oil repellency and low-temperature properties.

Also contemplated herein is a rubber article comprising the curable fluoropolyether rubber composition in the cured state.

DESCRIPTION OF THE PREFERRED EMBODIMENTS

Component (A) of the heat-curable fluoropolyether rubber composition according to the invention is a straight-chain fluoropolyether compound having at least two alkenyl groups in a molecule and a divalent perfluoroalkyl ether structure in the backbone.

The perfluoroalkyl ether structures include, for example, those of the following general formula (2):

wherein Rf is a straight or branched perfluoroalkylene group of 1 to 6 carbon atoms, preferably 1 to 3 carbon atoms, and letter q is an integer of 1 to 500, preferably 2 to 400, more preferably 10 to 200.

Examples of the recurring units —(Rf—O)— are shown below.

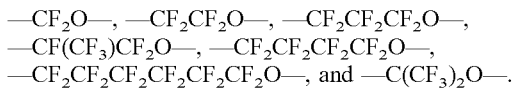

Of these, —CF$_2$O—, —CF$_2$CF$_2$O—, —CF$_2$CF$_2$CF$_2$O—, and —CF(CF$_3$)CF$_2$O— are preferred. It is understood that the perfluoroalkyl ether structure may consist of recurring units —(Rf—O)— of one type or recurring units of two or more types.

The alkenyl groups in the straight-chain fluoropolyether compound (A) are preferably those groups having 2 to 8 carbon atoms, especially 2 to 6 carbon atoms, and terminated with a CH$_2$=CH— structure, for example, vinyl, allyl, propenyl, isopropenyl, butenyl, and hexenyl. Of these, vinyl and allyl are preferred.

Typical of the straight-chain perfluoropolyether compound (A) are those having the following general formula (1):

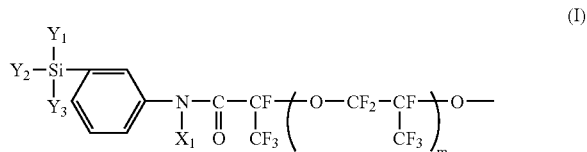

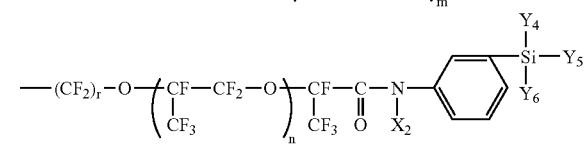

wherein X$_1$ and X$_2$ each are hydrogen, methyl, phenyl or allyl, at least two of Y$_1$, Y$_2$, Y$_3$, Y$_4$, Y$_5$ and Y$_6$ are alkenyl groups, the remaining Y groups are substituted or unsubstituted monovalent hydrocarbon groups, letter r is an integer of 2 to 6, m and n each are an integer of 0 to 200, and the sum of m+n is 0 to 400.

Desirably the straight-chain fluoropolyether compounds of formula (1) have a number average molecular weight of about 400 to 100,000 and more preferably about 5,000 to 25,000.

The straight-chain fluoropolyether compound of formula (1) preferably has an alkenyl content of 0.002 to 0.3 mol/100 g, and more preferably 0.008 to 0.12 mol/100 g. If the alkenyl content is less than 0.002 mol per 100 g of the straight-chain fluoropolyether compound, it may undesirably lead to a lower degree of crosslinkage and under-cure. An alkenyl content of more than 0.3 mol/100 g is undesirable because the mechanical properties as rubber elastomers of cured parts may be degraded.

Specific examples of the straight-chain fluoropolyether compound of formula (1) are given below.

treated with a surface treating agent containing silicon in a molecule, typically a silane for improving dispersibility.

Suitable surface treating agents for fumed silica are hydrophibizing agents. Typical hydrophibizing agents include silicon compounds having a hydrolyzable group, for example, organochlorosilanes such as dimethyldichlorosilane and trimethylchlorosilane, silazane compounds such as hexamethyldisilazane, and cyclic silazane compounds such as hexamethylcyclotrisilazane. It is especially preferred to use hexamethyldisilazane as the hydrophibizing agent.

Hydrophobized silica should preferably have a specific surface area of at least 50 $m^2/g$ for the purpose of improving mechanical properties. Also it should preferably have a specific surface area of up to 300 $m^2/g$ because otherwise compounding of silica into a composition may become difficult due to a viscosity build-up.

The amount of the reinforcing filler included is 1 to 100 parts by weight and preferably 10 to 30 parts by weight per

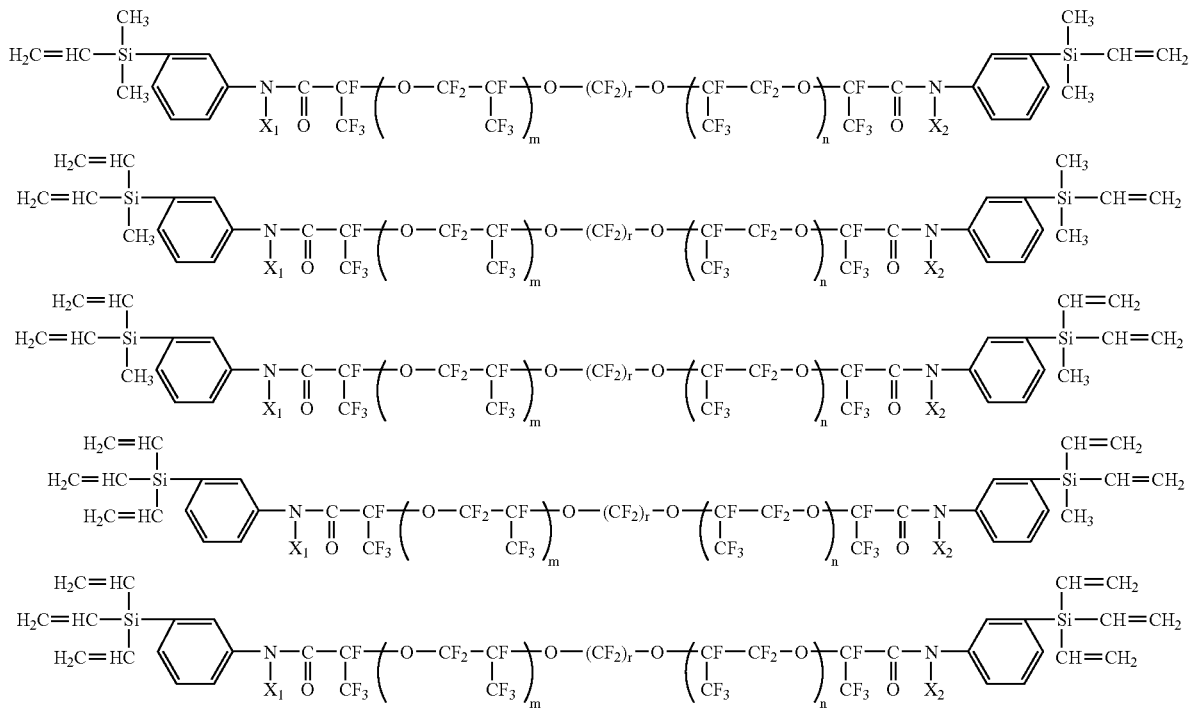

Note that letter r is an integer of 2 to 6 and m+n is an integer of 0 to 400.

These straight-chain fluoropolyether compounds may be used alone or in admixture as component (A).

Component (B) is a reinforcing filler. The reinforcing filler is added for the purposes of improving roll workability, mechanical strength, thermal stability, weather resistance, chemical resistance, flame retardance and the like, suppressing thermal shrinkage upon curing, reducing the coefficient of thermal expansion and gas permeability of elastomers obtained by curing, or the like.

Examples of suitable reinforcing fillers include fumed silica, colloidal silica, diatomaceous earth, quartz flour, glass fibers, carbon black, metal oxides such as iron oxide, titanium oxide and cerium oxide, and metal carbonates such as calcium carbonate and magnesium carbonate. These fillers may have been treated with surface treating agents. Of these, fumed silica and carbon black are preferred for mechanical strength. Most preferred is fumed silica which has been 100 parts by weight of component (A). With less than 1 pbw, the filler may fail to achieve the reinforcement effect. More than 100 pbw of the reinforcing filler is difficult to incorporate it into a composition due to a substantial viscosity build-up.

Component (C) is an organic peroxide. Examples include dibenzoyl peroxide, dicumyl peroxide, di-t-butyl peroxide, t-butyl peroxyacetate, t-butyl peroxybenzoate, 2,5-dimethyl-2,5-bis-t-butyl peroxyhexane, t-butylperoxy isopropyl monocarbonate, t-butylperoxy 2-ethylhexyl monocarbonate, 1,6-hexane diol bis-t-butylperoxy carbonate, etc. Of these, 2,5-dimethyl-2,5-bis-t-butyl peroxyhexane, t-butylperoxy isopropyl monocarbonate, t-butylperoxy 2-ethylhexyl monocarbonate, and 1,6-hexane diol bis-t-butylperoxy carbonate are preferred for crosslinking efficiency, storage stability and scorch retardation.

The amount of the organic peroxide included is an amount sufficient for component (A) to cure, and specifically 0.1 to 5 parts by weight and preferably 0.5 to 3 parts by weight per 100 parts by weight of component (A). Less than 0.1 pbw of the organic peroxide may lead to insufficient or slow crosslinking. More than 5 pbw of the organic peroxide may adversely affect physical properties.

In addition to components (A) to (C), the inventive composition may further include any of well-known additives, for example, internal mold release agents, wetters, colorants (e.g., pigments and dyes) and antioxidants, for the purpose of enhancing the practical usage of the composition. These additives are used in such amounts that the objects of the invention are not impaired.

With respect to the form of the inventive composition, it may be formulated, depending on a particular application, either as one-part type in which all essential components (A) to (C) are handled as a single composition, or as two-part type in which components (A) and (B) are combined to form a first package and component (C) as a second package is admixed therewith on use. The method of preparing the inventive composition is not particularly limited. The composition can be prepared simply by admixing the essential and optional components.

The composition thus obtained should preferably have a viscosity of 5 to 5,000 Pa·s at 25° C., more preferably 100 to 2,000 Pa·s at 25° C., as measured according to JIS K7117. Too high or too low a viscosity may lead to poor moldability.

With respect to the curing conditions for the inventive composition, primary curing is preferably performed at 100 to 200° C. for about 1 to 30 minutes. Temperatures below 100° C. need a longer curing time, which may lead to a lowering of industrial productivity. Temperatures above 200° C. have the risk of scorching. Thus the curing temperature is preferably in the range of 100 to 200° C. and more preferably 120 to 170° C. At a temperature within the range, the curing time may be selected as appropriate so that crosslinking reaction is completed. For stabilizing the physical properties of the composition, secondary curing is preferably performed by heat treatment at 100 to 230° C. for about 1 to 24 hours. For the secondary curing, temperatures below 100° C. are less effective whereas temperatures above 230° C. may incur thermal degradation. Heat treatment at 150 to 200° C. for about 1 to 20 hours is more preferred for the secondary curing.

The inventive compositions and rubber articles made thereof can be used in a variety of applications. Because of high fluorine contents, they have excellent solvent resistance and chemical resistance as well as low moisture permeability. Because of low surface energy, they have excellent parting properties and water repellency. Typically they are used as automotive rubber parts where oil resistance is required.

Rubber articles made of the cured composition of the invention include, but are not limited to, rubber parts for automobiles, for example, diaphragms such as fuel regulator diaphragms, pulsation damper diaphragms, oil pressure switch diaphragms, and EGR diaphragms, valves such as canister valves and power control valves, O-rings such as quick connector O-rings and injector O-rings, and seals such as oil seals and cylinder head gaskets;

rubber parts for chemical plants, for example, pump diaphragms, valves, O-rings, packings, oil seals, and gaskets;

rubber parts for ink jet printers and semiconductor manufacturing lines, for example, diaphragms, valves, O-rings, packings, and gaskets;

rubber parts for analytical and scientific instruments and medical equipment, for example, pump diaphragms, O-rings, packings, valves, and joints;

tent film materials, sealants, molded parts, extruded parts, coatings, copier roll materials, electrical moisture-proof coatings, sensor potting materials, fuel cell seals, and laminate rubber fabrics; and rubber parts for aircraft, for example, O-rings, face seals, packings, gaskets, diaphragms, and valves in fluid piping for engine oil, jet fuel, hydraulic oil and Skydrol®.

EXAMPLE

Examples of the invention are given below by way of illustration and not by way of limitation. All parts are by weight.

The materials used in Examples are identified below.

Polymer 1
a polymer compound having formula (3),
viscosity 1180 Pa·s, vinyl content 0.037 mol/100 g (3)

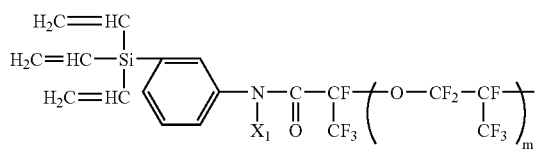 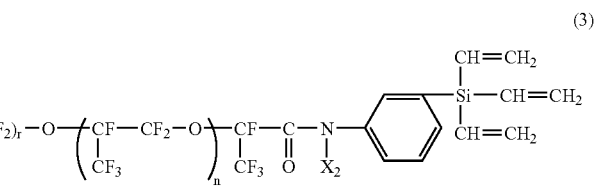

Polymer 2
a polymer compound having formula (4),
viscosity 920 Pa·s, vinyl content 0.013 mol/100 g (4)

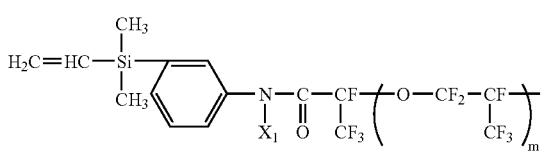 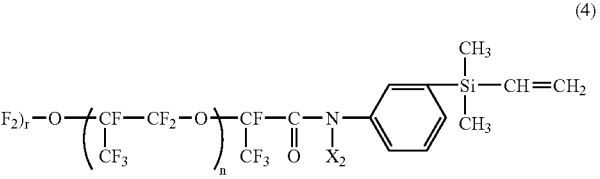

Filler 1
 R8200 (trade name, Nippon Aerosil Co., Ltd.), fumed silica surface treated with hexamethyldisilazane Filler 2
 Denka Black FX-35 (trade name, Denki Kagaku Kogyo K.K.), carbon black Organic Peroxide
 Perbutyl BH-45 (trade name, NOF Corp.), 1,6-hexane diol bis-t-butylperoxy carbonate Examples 1-5

A reinforcing filler was added to a polymer or a mixture of polymers in accordance with the formulation shown in Table 1. They were mixed, heat treated and milled on a three-roll mill, forming a base compound. An organic peroxide was added to the base compound in accordance with the formulation shown in Table 1, forming a composition. The composition was deaerated in vacuum, admitted into a rectangular frame of 2 mm high, deaerated again, and press cured at 100 kg/cm² and 150° C. for 10 minutes. Test specimens were cut out of the cured sample and measured for rubber physical properties in accordance with JIS K6251 and K6253. The results are also shown in Table 1.

Comparative Example 1

A reinforcing filler was added to a polymer in accordance with the formulation shown in Table 1. They were mixed, heat treated and milled on a three-roll mill, forming a base compound. To the base compound were added 0.2 part of a toluene solution of a catalyst comprising chloroplatinic acid modified with a compound of formula (5) (platinum concentration 0.5 wt %), 0.2 part of a 50% toluene solution of ethynyl cyclohexanol and 2.17 parts of an SiH group-bearing organosilicon compound of formula (6). They were uniformly mixed to form a curable fluoropolyether rubber composition. This composition was cured by the same process as in Examples 1-5. Test specimens cut out of the cured sample were measured for rubber physical properties in accordance with JIS K6251 and K6253. The results are also shown in Table 1.

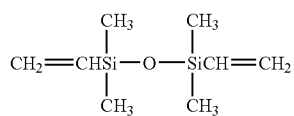
(5)

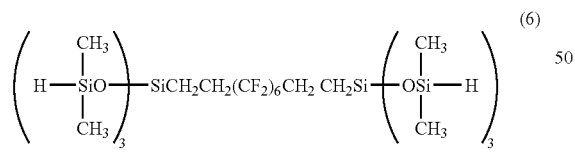
(6)

TABLE 1

| Formulation (pbw) | Example 1 | Example 2 | Example 3 | Example 4 | Example 5 | Comparative Example 1 |
|---|---|---|---|---|---|---|
| A |  |  |  |  |  |  |
| Polymer 1 | 100 | — | 75 | 50 | 50 | 100 |
| Polymer 2 | — | 100 | 25 | 50 | 50 | — |
| Vinyl content (mol/100 g) | 0.037 | 0.013 | — | — | — | 0.037 |
| B |  |  |  |  |  |  |
| Filler 1 | 20 | 20 | 20 | 20 | 20 | 20 |
| Filler 2 | — | — | — | — | 0.25 | 0.25 |
| C |  |  |  |  |  |  |
| Organic Peroxide | 1.19 | 1.19 | 1.19 | 1.19 | 1.19 | — |
| Rubber physical properties |  |  |  |  |  |  |
| Hardness (Durometer A) | 80 | 30 | 78 | 72 | 69 | 65 |
| Tensile strength (MPa) | 4.8 | 2.6 | 5.1 | 5.3 | 5.1 | 3.4 |
| Elongation (%) | 80 | 390 | 90 | 120 | 130 | 130 |

A comparison of Example 1 with Example 2 reveals that a polymer having a higher vinyl content cures into a rubber having a higher hardness.

Example 6

The test specimen of Example 5 shown in Table 1 was examined for heat resistance in air. The specimen was heated in air at 204° C. for 1,000 hours, during which period physical properties were determined at intervals. The results are shown in Table 2.

Comparative Example 2

The test specimen of Comparative Example 1 shown in Table 1 was examined for heat resistance in air as in Example 6. The results are also shown in Table 2.

TABLE 2

| Heating time | Example 6 Hardness (Durometer A) | Example 6 Tensile strength (MPa) | Example 6 Elongation (%) | Comparative Example 2 Hardness (Durometer A) | Comparative Example 2 Tensile strength (MPa) | Comparative Example 2 Elongation (%) |
|---|---|---|---|---|---|---|
| Initial | 69 | 5.1 | 130 | 65 | 3.4 | 130 |
| 125 hr | 69(0) | 4.7(−8) | 100(−23) | 67(+2) | 3.4(0) | 110(−15) |
| 250 hr | 68(−1) | 4.7(−8) | 100(−23) | 66(+1) | 3.2(−6) | 90(−31) |

TABLE 2-continued

| | Example 6 | | | Comparative Example 2 | | |
|---|---|---|---|---|---|---|
| Heating time | Hardness (Durometer A) | Tensile strength (MPa) | Elongation (%) | Hardness (Durometer A) | Tensile strength (MPa) | Elongation (%) |
| 500 hr | 70(+1) | 4.3(−16) | 90(−31) | 67(+2) | 3.2(−6) | 90(−31) |
| 1000 hr | 70(+1) | 4.3(−16) | 80(−38) | 67(+2) | 3.1(−12) | 90(−31) |

In Table 2, the values in parentheses indicate an increase/decrease of Durometer A units for hardness and a percent increase/decrease for tensile strength and elongation.

With respect to the change of rubber physical properties by heat aging at 204° C. for 1,000 hours, there is no substantial difference between Example 6 wherein the crosslinking method is radical reaction using an organic peroxide and Comparative Example 2 wherein the crosslinking method is hydrosilylating catalytic reaction.

There have been described heat-curable fluoropolyether rubber compositions which avoid cure inhibition by catalyst poisons because they are crosslinked through radical reaction using organic peroxides.

Japanese Patent Application No. 2003-060001 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A heat-curable fluoropolyether rubber composition comprising (A) 100 parts by weight of a straight-chain perfluoropolyether compound represented by the general formula (1):

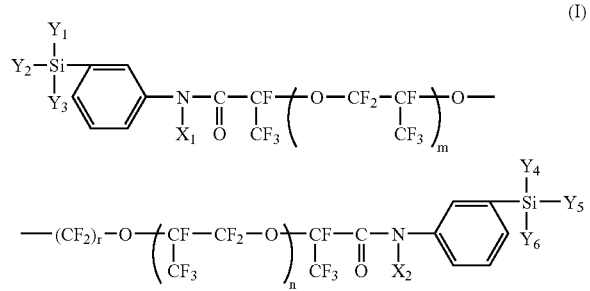

(I)

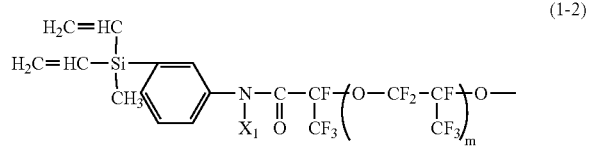

wherein $X_1$ and $X_2$ each are hydrogen, methyl, phenyl, or allyl, at least three of $Y_1$, $Y_2$, $Y_3$, $Y_4$, $Y_5$, and $Y_6$ are alkenyl groups, the remaining Y groups are substituted or unsubstituted monovalent hydrocarbon groups, r is an integer of 2 to 6, and m and n each are integers such that the number average molecular weight of the compound of formula (1) is 5000 to 25,000, wherein component (A) is one of the compounds represented by the following formulae (1-2) to (1-5) or a mixture thereof:

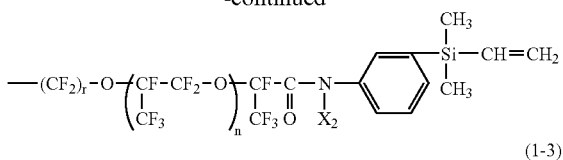

(1-3)

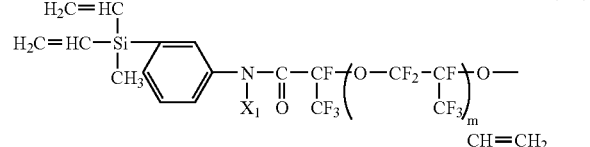

(1-4)

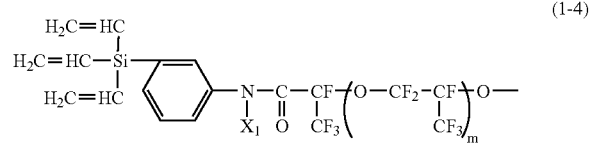

(1-5)

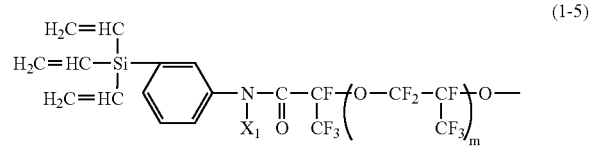

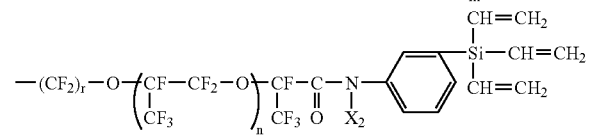

and the alkenyl content in the compound is 0.008 to 0.12 mol/100 grams, (B) 1 to 100 parts by weight of a reinforcing filler, and (C) 0.1 to 5 parts by weight of an organic peroxide.

2. The composition of claim 1 wherein the reinforcing filler (B) is carbon black, fumed silica or fumed silica treated with a surface treating agent containing silicon in a molecule.

3. A rubber article manufactured by heat-curing the curable fluoropolyether rubber composition of claim 1.

4. The rubber article of claim 3, configured for use in automobiles, chemical plants, ink jet printers, semiconductor manufacturing lines, analytical or scientific instruments, medical equipment, aircraft or fuel cells.

5. The rubber article of claim 3, configured as a diaphragm, valve, O-ring, oil seal, gasket, packing, joint or face seal.

6. A heat-curable fluoropolyether rubber composition comprising (A) 100 parts by weight of a straight-chain perfluoropolyether compound represented by the general formula (1):

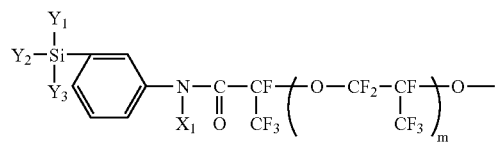

(I)

-continued

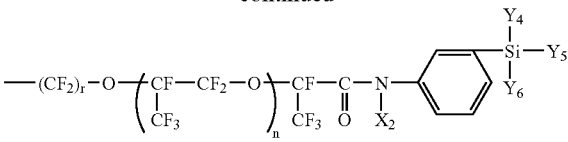

wherein $X_1$ and $X_2$ each are hydrogen, methyl, phenyl, or allyl, at least two of $Y_1$, $Y_2$, $Y_3$, $Y_4$, $Y_5$, and $Y_6$ are alkenyl groups, the remaining Y groups are substituted or unsubstituted monovalent hydrocarbon groups, r is an integer of 2 to 6, and m and n each are integers such that the number average molecular weight of the compound of formula (1) is 5000 to 25,000, wherein component (A) is a mixture of (A-1) one of the compounds represented by the following formulae (1-2) to (1-5) or a mixture thereof:

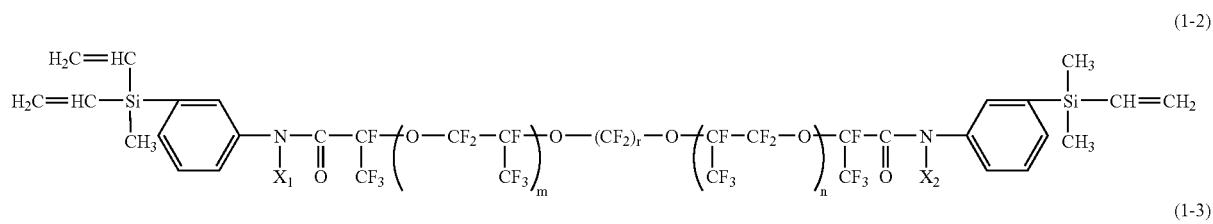

(1-2)

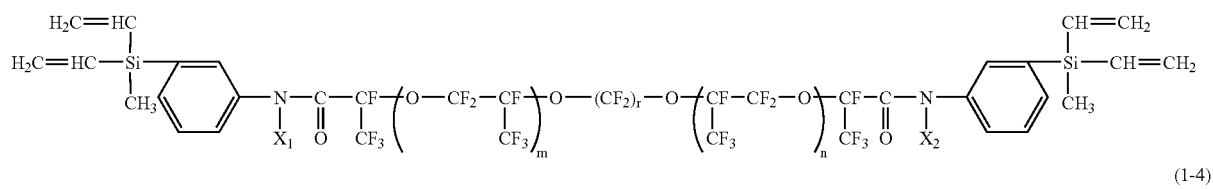

(1-3)

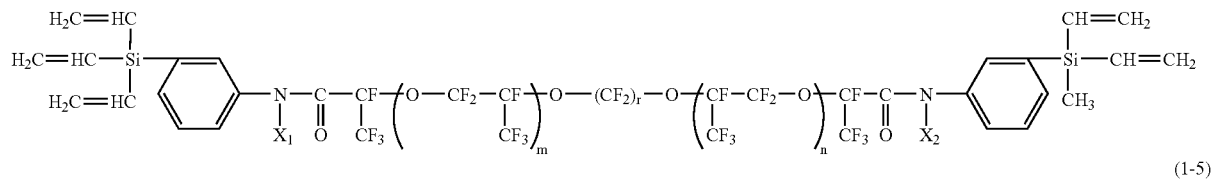

(1-4)

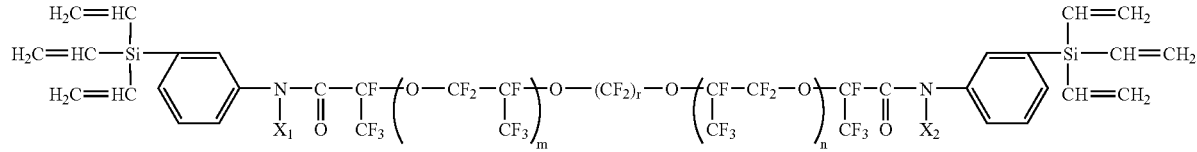

(1-5)

and
(A-2) a compound represented by the following formula (1-1):

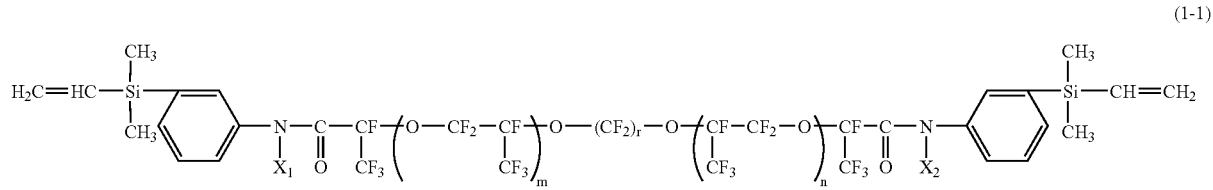

(1-1)

and the alkenyl content in the compound is 0.008 to 0.12 mol/100 grams,
(B) 1 to 100 parts by weight of a reinforcing filler, and
(C) 0.1 to 5 parts by weight of an organic peroxide.

7. The composition of claim 6, wherein the reinforcing filler (B) is carbon black, fumed silica, or fumed silica treated with a surface-treating agent containing silicon in a molecule.

8. A rubber article manufactured by heat-curing the curable fluoropolyether rubber composition of claim 6.

9. The rubber article of claim 8, configured for use in automobiles, chemical plants, ink jet printers, semiconductor manufacturing lines, analytical or scientific instruments, medical equipment, aircraft, or fuel cells.

10. The rubber article of claim 8, configured as a diaphragm, valve, O-ring, oil seal, gasket, packing, joint, or face seal.

* * * * *